(12) United States Patent
Welc et al.

(10) Patent No.: US 9,336,066 B2
(45) Date of Patent: May 10, 2016

(54) HYBRID LINEAR VALIDATION ALGORITHM FOR SOFTWARE TRANSACTIONAL MEMORY (STM) SYSTEMS

(75) Inventors: Adam Welc, Mountain View, CA (US); Bratin Saha, San Jose, CA (US); Ali-Reza Adl-Tabatabai, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 1532 days.

(21) Appl. No.: 12/142,097

(22) Filed: Jun. 19, 2008

(65) Prior Publication Data
US 2009/0319753 A1    Dec. 24, 2009

(51) Int. Cl.
*G06F 9/52*    (2006.01)
*G06F 9/46*    (2006.01)

(52) U.S. Cl.
CPC ............... *G06F 9/526* (2013.01); *G06F 9/466* (2013.01)

(58) Field of Classification Search
CPC ................................. G06F 9/526; G06F 9/466
USPC ................... 707/703, 704, 999.009, 999.909; 711/147
See application file for complete search history.

(56) References Cited

U.S. PATENT DOCUMENTS

| | | | |
|---|---|---|---|
| 7,478,210 B2* | 1/2009 | Saha et al. ..................... | 711/159 |
| 7,542,977 B2* | 6/2009 | Hudson et al. | |
| 7,793,052 B2* | 9/2010 | Goodman et al. ............. | 711/147 |
| 2006/0173885 A1* | 8/2006 | Moir et al. ..................... | 707/101 |
| 2006/0259518 A1* | 11/2006 | Lomet et al. .................. | 707/201 |
| 2011/0040738 A1* | 2/2011 | Magruder et al. ............. | 707/704 |

OTHER PUBLICATIONS

Saha et al, "Architectural Support for Software Transactional Memory", 2006, 39th Annual IEEE/ACM Internation Symposium on Microarchitecture (MICRO'06).*
Chi Cao Minh et al, "An Effective Hybrid Transactional Memory System with Strong Isolation Guarantees", Jun. 13, 2007.*
Keir Fraser, "Concurrent Programming Without Locks", 2007.*
Virendra J Marathe et al, "Toward High Performance Nonblocking Software Transactional Memory", Feb. 2008.*
Peter Damron et al, "Hybrid Transactional Memory", Oct. 2006.*
Deitel and Deitel, "C How to Program", 2007, Pearson Education, 5th edition.*
Bratin Saha et al, "Architectural Support for Software Transactional Memory", 2006.*

* cited by examiner

*Primary Examiner* — Brannon W Smith
(74) *Attorney, Agent, or Firm* — Barnes & Thornburg LLP

(57) ABSTRACT

A method and apparatus for hybrid validation for a Software Transaction Memory (STM) is herein described. During execution of a transaction, when acquiring ownership of meta-data associated with a data element, the meta-data is updated with an ownership reference to a transaction to enable efficient subsequent ownership tests. However, during validation, for some conditions, meta-data is updated from the ownership reference to a write entry reference to enable efficient validation.

20 Claims, 4 Drawing Sheets

HYBRID LINEAR VALIDATION ALGORITHM FOR SOFTWARE TRANSACTIONAL MEMORY (STM) SYSTEMS

FIELD

This invention relates to the field of processor execution and, in particular, to execution of groups of instructions.

BACKGROUND

Advances in semi-conductor processing and logic design have permitted an increase in the amount of logic that may be present on integrated circuit devices. As a result, computer system configurations have evolved from a single or multiple integrated circuits in a system to multiple cores and multiple logical processors present on individual integrated circuits. A processor or integrated circuit typically comprises a single processor die, where the processor die may include any number of cores or logical processors.

The ever increasing number of cores and logical processors on integrated circuits enables more software threads to be concurrently executed. However, the increase in the number of software threads that may be executed simultaneously have created problems with synchronizing data shared among the software threads. One common solution to accessing shared data in multiple core or multiple logical processor systems comprises the use of locks to guarantee mutual exclusion across multiple accesses to shared data. However, the ever increasing ability to execute multiple software threads potentially results in false contention and a serialization of execution.

For example, consider a hash table holding shared data. With a lock system, a programmer may lock the entire hash table, allowing one thread to access the entire hash table. However, throughput and performance of other threads is potentially adversely affected, as they are unable to access any entries in the hash table, until the lock is released. Alternatively, each entry in the hash table may be locked. Either way, after extrapolating this simple example into a large scalable program, it is apparent that the complexity of lock contention, serialization, fine-grain synchronization, and deadlock avoidance become extremely cumbersome burdens for programmers.

Another recent data synchronization technique includes the use of transactional memory (TM). Often transactional execution includes executing a grouping of a plurality of micro-operations, operations, or instructions. In the example above, both threads execute within the hash table, and their accesses are monitored/tracked. If both threads access/alter the same entry, conflict resolution may be performed to ensure data validity. One type of transactional execution includes a Software Transactional Memory (STM), where accesses are tracked, conflict resolution, abort tasks, and other transactional tasks are performed in software.

Often, in a read optimistic concurrency STM, lightweight barriers are performed for reads, such as logging versions associated with the reads, while more extensive barriers are performed for writes, such as acquiring a lock for the location to be written. In a direct ownership STM, an ownership test for a location is capable of being efficiently performed; as meta-data for the location indicates directly which transaction owns the location. However, during validation, if a location that is read and then written is encountered, the meta-data location does not include sufficient direct information for efficient validation. Consequently, a write set is potentially searched to determine if no other transaction updated the location between the read and the lock acquire for the write, which results in an expensive validation procedure.

In contrast, with an indirect STM, meta-data for locations often includes sufficient write-set entry information to perform efficient validation, i.e. determining if no other transaction updated the location between the read and the lock acquire for the write; as the meta-data include direct write entry location information. However, an ownership test during execution of the transaction in the indirect STM is potentially inefficient, since the transaction ownership information is accessed indirectly through a write entry of a write set.

BRIEF DESCRIPTION OF THE DRAWINGS

The present invention is illustrated by way of example and not intended to be limited by the figures of the accompanying drawings.

DETAILED DESCRIPTION

In the following description, numerous specific details are set forth such as examples of specific hardware/software support for transactional execution, specific shared memory access tracking, specific locking/versioning/meta-data methods, specific types of local/memory in processors, and specific types of memory accesses and locations, etc. in order to provide a thorough understanding of the present invention. It will be apparent, however, to one skilled in the art that these specific details need not be employed to practice the present invention. In other instances, well known components or methods, such as coding of transactions in software, demarcation of transactions, specific and alternative multi-core and multi-threaded processor architectures, transaction hardware, cache organizations, specific compiler methods/implementations, and specific operational details of microprocessors, have not been described in detail in order to avoid unnecessarily obscuring the present invention.

The method and apparatus described herein are for hybrid transactional validation. Specifically, hybrid transactional validation is primarily discussed in reference to an illustrative optimistic read Software Transactional Memory system (STM). However, the methods and apparatus for hybrid transactional validation are not so limited, as they may be implemented in associated with any transactional memory system.

Figure 1:
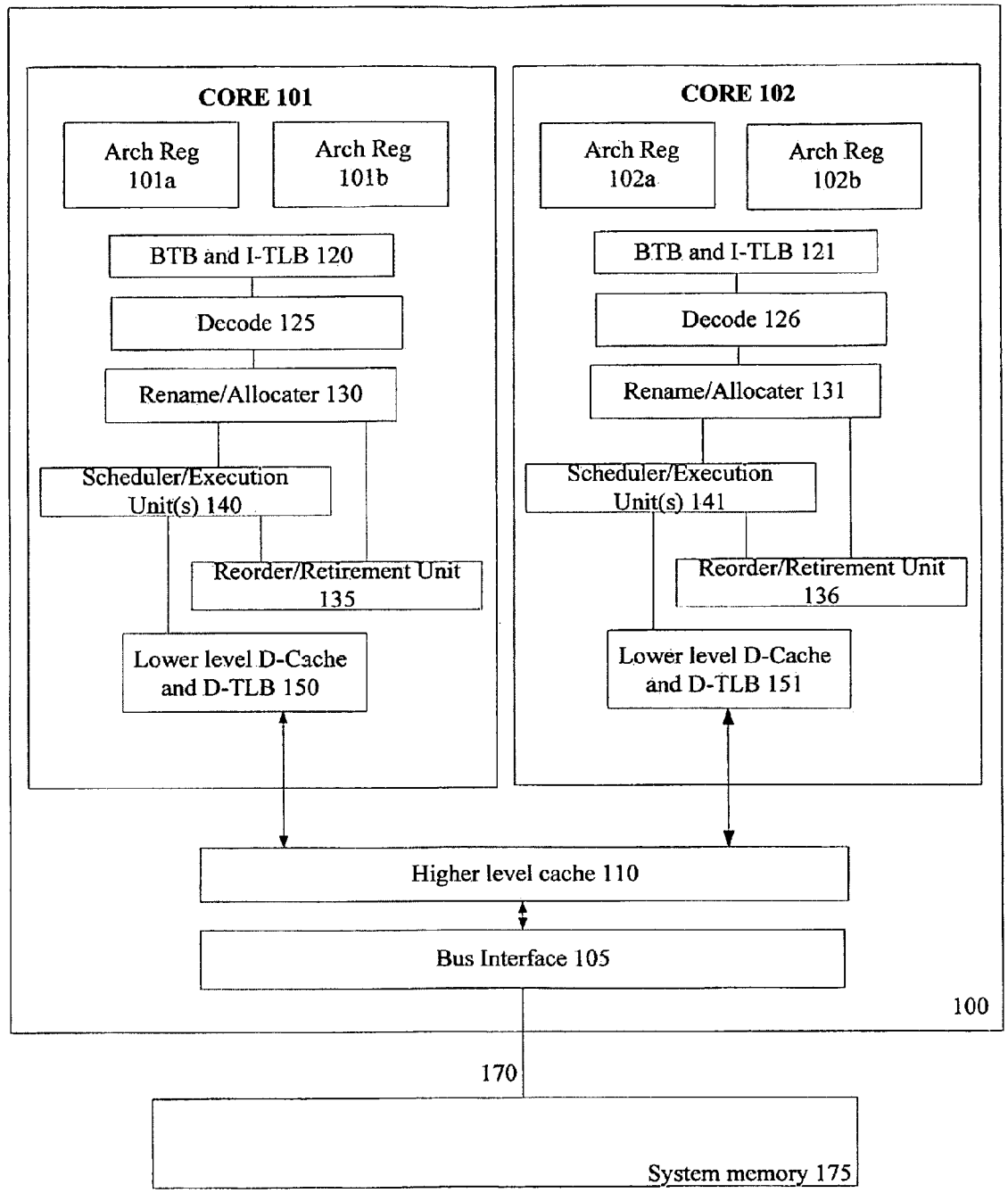
FIG. 1 illustrates an embodiment of a processor including multiple processing elements capable of executing multiple software threads.

Referring to FIG. 1, an embodiment of a processor capable of hybrid linear validation for a Software Transactional Memory (STM) system is illustrated. Processor 100 includes any processor, such as a micro-processor, an embedded processor, a digital signal processor (DSP), a network processor, or other device to execute code. Processor 100 includes a plurality of processing elements.

In one embodiment, a processing element refers to a thread unit, a process unit, a context, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state wherein each independently maintained architectural state is associated with at least some dedicated execution resources. In contrast to cores, a hardware thread, which may also be referred to as a physical thread, typically refers to any logic located on an integrated circuit capable of maintaining an independent architectural state wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores, core 101 and 102, which share access to higher level cache 110. Although processor 100 may include asymmetric cores, i.e. cores with different configurations, functional units, and/or logic, symmetric cores are illustrated. As a result, core 102, which is illustrated as identical to core 101, will not be discussed in detail to avoid repetitive discussion. In addition, core 101 includes two hardware threads 101a and 101b, while core 102 includes two hardware threads 102a and 102b. Therefore, software entities, such as an operating system, potentially view processor 100 as four separate processors, i.e. four processors capable of independently executing four active software threads.

Here, a first thread is associated with architecture state registers 101a, a second thread is associated with architecture state registers 101b, a third thread is associated with architecture state registers 102a, and a fourth thread is associated with architecture state registers 102b. As illustrated, architecture state registers 101a are replicated in architecture state registers 101b, so individual architecture states/contexts are capable of being stored for logical processor 101a and logical processor 101b. Other smaller resources, such as instruction pointers and renaming logic in rename allocator logic 130 may also be replicated for threads 101a and 101b. Some resources, such as reorder buffers in reorder/retirement unit 135, ILTB 120, load/store buffers, and queues may be shared through partitioning. Other resources, such as general purpose internal registers, page-table base register, low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of exemplary functional units/resources of a processor is illustrated. Note that a processor may include, or omit, any of these functional units, as well as include any other known functional units, logic, or firmware not depicted.

As illustrated, processor 100 includes bus interface module 105 to communicate with devices external to processor 100, such as system memory 175, a chipset, a northbridge, or other integrated circuit. Memory 175 may be dedicated to processor 100 or shared with other devices in a system. Higher-level or further-out cache 110 is to cache recently fetched elements from higher-level cache 110. Note that higher-level or further-out refers to cache levels increasing or getting further way from the execution unit(s). In one embodiment, higher-level cache 110 is a second-level data cache. However, higher level cache 110 is not so limited, as it may be associated with or include an instruction cache. A trace cache, i.e. a type of instruction cache, may instead be coupled after decoder 125 to store recently decoded traces. Module 120 also potentially includes a branch target buffer to predict branches to be executed/taken and an instruction-translation buffer (I-TLB) to store address translation entries for instructions.

Decode module 125 is coupled to fetch unit 120 to decode fetched elements. In one embodiment, processor 100 is associated with an Instruction Set Architecture (ISA), which defines/specifies instructions executable on processor 100. Here, often machine code instructions recognized by the ISA include a portion of the instruction referred to as an opcode, which references/specifies an instruction or operation to be performed.

In one example, allocator and renamer block 130 includes an allocator to reserve resources, such as register files to store instruction processing results. However, threads 110a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

In one embodiment, processor 100 is capable of transactional execution. A transaction, which may also be referred to as a critical or atomic section of code, includes a grouping of instructions, operations, or micro-operations to be executed as a group. For example, instructions or operations may be used to demarcate a transaction or a critical section. Typically, during execution of a transaction, updates to memory are not made globally visible until the transaction is committed. While the transaction is still pending, locations loaded from and written to within a memory are tracked. Upon successful validation of those memory locations, the transaction is committed and updates made during the transaction are made globally visible.

However, if the transaction is invalidated during its pendancy, the transaction is restarted without making the updates globally visible. As a result, pendency of a transaction, as used herein, refers to a transaction that has begun execution and has not been committed or aborted, i.e. pending. Example implementations for transactional execution include a Hardware Transactional Memory (HTM) system, a Software Transactional Memory (STM) system, and a combination thereof.

A Hardware Transactional Memory (HTM) system often refers to tracking access during execution of a transaction in hardware of processor 100. For example, cache 150 is to cache a data item/object from system memory 175 for use by processing elements 110*a* and 101*b*. During execution of a transaction, an annotation/attribute field is associated with a cache line in cache 150, which is to hold the data object. The annotation field is utilized to track accesses to and from the cache line. In one embodiment, if a write to a cache line that has previously tracked a load during a transaction occurs, then a data conflict is detected utilizing the cache line annotations.

A Software Transactional Memory (STM) system often refers to performing access tracking, conflict resolution, or other transactional memory tasks in, or at least partially in, software. As a general example, a compiler, when executed, compiles program code to insert calls to read and write barriers for transactional load and store operations, accordingly. A compiler may also insert other transactional and non-transaction related operations, such as commit operations, abort operations, bookkeeping operations, conflict detection operations, and strong atomicity operations.

Figure 2:
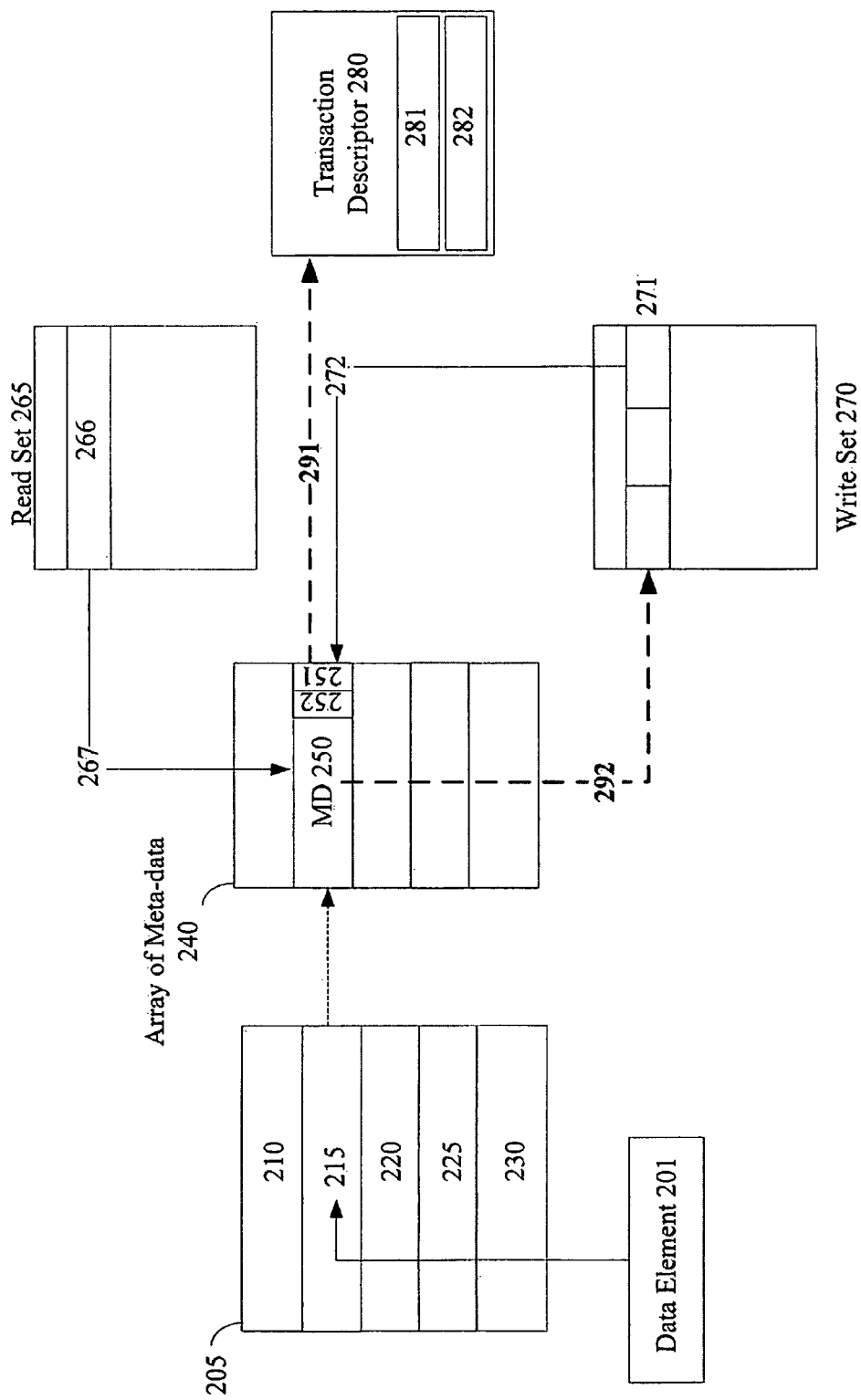
FIG. 2 illustrates an embodiment of modules to support hybrid transactional validation.

Referring to FIG. 2, a simplified illustrative embodiment of a hybrid validation STM system is depicted. For example, a hybrid direct and indirect STM is utilized for data ownership and transaction validation. In one embodiment, a transaction is associated with a transaction descriptor, such as transaction descriptor 280. Transaction descriptor 280 includes information about a transaction. In other words, transaction descriptor 280 is often said to represent an associated transaction. Transaction descriptor 280 may include any information about the transaction, such as a transaction ID to reference transaction 281, a state of the transaction (Active state 282), or other known transaction related information.

In one embodiment, memory locations and/or data elements, such as data element 201 held in cache line 215, are associated with meta-data locations, such as meta-data location 250 in array 240. As an illustrative example, a portion of an address associated with line 215 of cache memory 205 is hashed to index location 250 in array 240. Often, in regards to transactional memory, meta-data location 250 is referred to as a transaction record. Although transaction record 250, as illustrated, is associated with a single cache line, a transaction record may be provided at any data granularity level, such as a size of data element 201, which may be smaller or larger than cache line 215, as well as include an operand, an object, a class, a type, a data structure, or any other element of data.

Here, when a memory location or data element, such as data element 201 held in cache line 215 is unlocked, meta-data location 250 holds a version value, i.e. a version number of data element 201. As an illustrative example, a read barrier, which is often to be executed in response to encountering a load operation to read data element 201, logs a previous version value in a read entry 266 of a read log 265. As a result, later this logged version value may be utilized to determine if data element 201 was updated during execution of transaction 281, i.e. a current value held in meta-data location 250 is different from the logged version value held in read entry 266. In addition, read entry 266 may also hold other information, such as a reference or pointer to transaction descriptor 280 to indicate that transaction 281 performed the load operation associated with read entry 266. However, in other embodiments, a read set is associated with a given transaction, i.e. pointed to by a transaction's transaction descriptor, so a pointer to the transaction descriptor may not be included.

Continuing the example, when a data element or a memory location is owned, meta-data location 250 holds a locked or owned value. In one embodiment, a locked or owned value includes a reference to a transaction. As a specific illustrative example, the reference to a transaction includes a pointer to transaction descriptor 280 associated with transaction 281. In other words, transaction record 250 holds a pointer to transaction descriptor 280 to indicate transaction 281 owns data element 201 held in line 215. As stated above, this direct reference to a transaction that owns a location is herein referred to as a direct STM.

In another embodiment, an owned or locked value includes a reference to a write set entry. As an example, an owned value includes a pointer to write entry 271 of write set 270. Here, when transaction 281 is to perform a write to data element 201, a lock is first acquired, i.e. transaction record 250 is updated to include the pointer to write entry 271, which is associated with the write to data element 201. Write entry 271 may hold any write information. In one embodiment, write entry 271 is to hold a logged version number form transaction record 250 before the lock is acquired, a pointer to transaction descriptor 280 to indicate that transaction 281 is associated with the write entry, and a back pointer to transaction record 250. Note in other embodiment, other information may be held in write entry 271, while other fields are potentially omitted, such as the field to hold the pointer to transaction descriptor 280. For example, a pointer to the transaction descriptor may be part of the write set data structure itself, rather than being part of a single entry within the write set. As stated above, this indirect reference from transaction record 250 to transaction descriptor 280 through write entry 271 is referred to as an indirect STM.

The direct STM and indirect STM each have benefits during different stages of execution of a transaction. For example, when a read or write to data element 201 is encountered during execution of a transaction, the appropriate transactional barrier, when executed, is to perform an ownership test. In one embodiment, the ownership test includes checking version field 251 of meta-data location 250. For example, a version bit is set to a first value when meta-data location 250 holds a version value, i.e. unlocked, and a second value when meta-data location 250 is owned. To illustrate, if the version bit is the Least Significant Bit (LSB), then all odd transaction record numbers represent versions while even numbers represent owned states, i.e. LSB set represents a version and LSB unset represents an owned state.

Yet, when a meta-data location 250 includes an owned value, in one embodiment, the ownership test further includes determining an owner of the transaction. For example, upon encountering a memory access operation in transaction 281, the ownership test is performed. Here, it is assumed that meta-data location 250 includes a locked value. In the direct STM, the locked value includes a reference to an owning transaction, such as transaction descriptor 280 for transaction 281. As a result, transaction 281 is directly capable of determining that it already owns transaction record 250, i.e. transaction record 250 points to transaction descriptor 280 for transaction 281. Consequently, transaction 281 may perform the memory access, since it already owns transaction record 250.

In contrast, in an indirect STM, to determine an owning transaction, instead of directly referencing transaction descriptor 280, transaction record 250 references a write entry associated with the owner of transaction record 250. As an example, transaction record 250 includes a pointer to write entry 271, and write entry 271 includes a pointer to transaction descriptor 280 as a result of a previous write from transaction 281 that lead to the acquisition of transaction record 250. Therefore, to make an ownership determination during execution of a transaction, the direct method is potentially more efficient as it directly references transaction ownership instead of a write entry.

However, during validation of transaction 281, the indirect STM is potentially more efficient in certain validation circumstances. As described above, during validation of a transaction, a read set is validated. In other words, a logged version value held in read entry 266 is compared against a current value held in transaction record 250. If the current value is the same as the logged version, then no other access has updated data element 201. Consequently, the read associated with entry 266 is determined to be valid. However, if the versions are different, then in one embodiment, it is determined if the transaction itself updated transaction record 250. Here, if a transaction reads and then writes to a data element, then the execution is still valid as long as there are no other intermediate accesses performed by other transactions that could invalidate the transaction.

Consequently, during read set validation in a direct STM, if it is determined that transaction record 250 references transaction descriptor 280, then it means that transaction 281 has both read and written data element 201. The read and write operations are described, respectively, by read set entry 266 and write sent entry 271. Then, write set 270 for transaction 281 is searched to locate entry 271 in order to determine a logged version number from before the write lock was acquired. Here, the logged version from read entry 266 is compared with the logged version from write entry 271. Note if the versions are different, then some other access has updated transaction record 250, and as a result, the transaction is invalidated. However, if the versions are the same, then validation may continue, since it was determined no update of transaction record 250 occurred outside transaction 281.

It can be seen from this example, that the cost in the direct STM during the above described validation circumstance is potentially the size of read set 265 multiplied by the size of write set 270. In contrast, with an indirect STM, instead of searching the write set for a corresponding entry, the locked value of transaction record 250 includes a pointer to write entry 271. Here, the versions may be directly compared, which is potentially more efficient.

Therefore, in one embodiment, a hybrid STM is utilized, where a direct reference to an owning transaction is utilized for locks of transaction records during execution of the transaction, and an indirect reference to an associated write entry is utilized during validation of the transaction. In another embodiment, a direct STM is utilized for execution during a transaction, and an indirect STM is utilized during a condition of validation. For example, the direct STM is similar in efficiency to the indirect STM during validation when compared versions equal indicating a valid read entry. Therefore, in one embodiment, the indirect STM is utilized during a validation condition, such as when a data element is read by and written to during execution of a transaction.

The examples above includes one embodiment of implementing an STM and one embodiment of implementing an HTM; however, any known implementation of a transactional memory system may be utilized in conjunction with dynamic optimization of transactional barriers for strong atomicity, such as an HTM, an STM, an Unbounded Transactional Memory (UTM) system, a hybrid Transactional Memory system, such as a hardware accelerated STM (HASTM), or any other transactional memory system.

Figure 3:
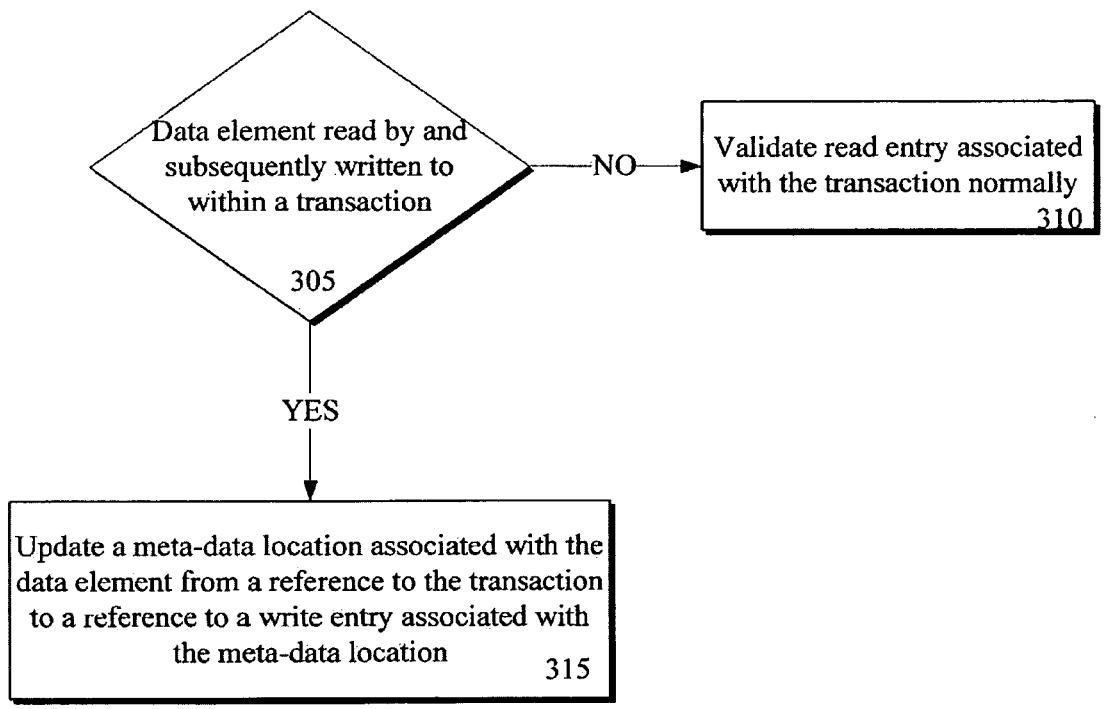
FIG. 3 illustrates an embodiment of a flowchart for a method of hybrid transactional validation.
Figure 4:
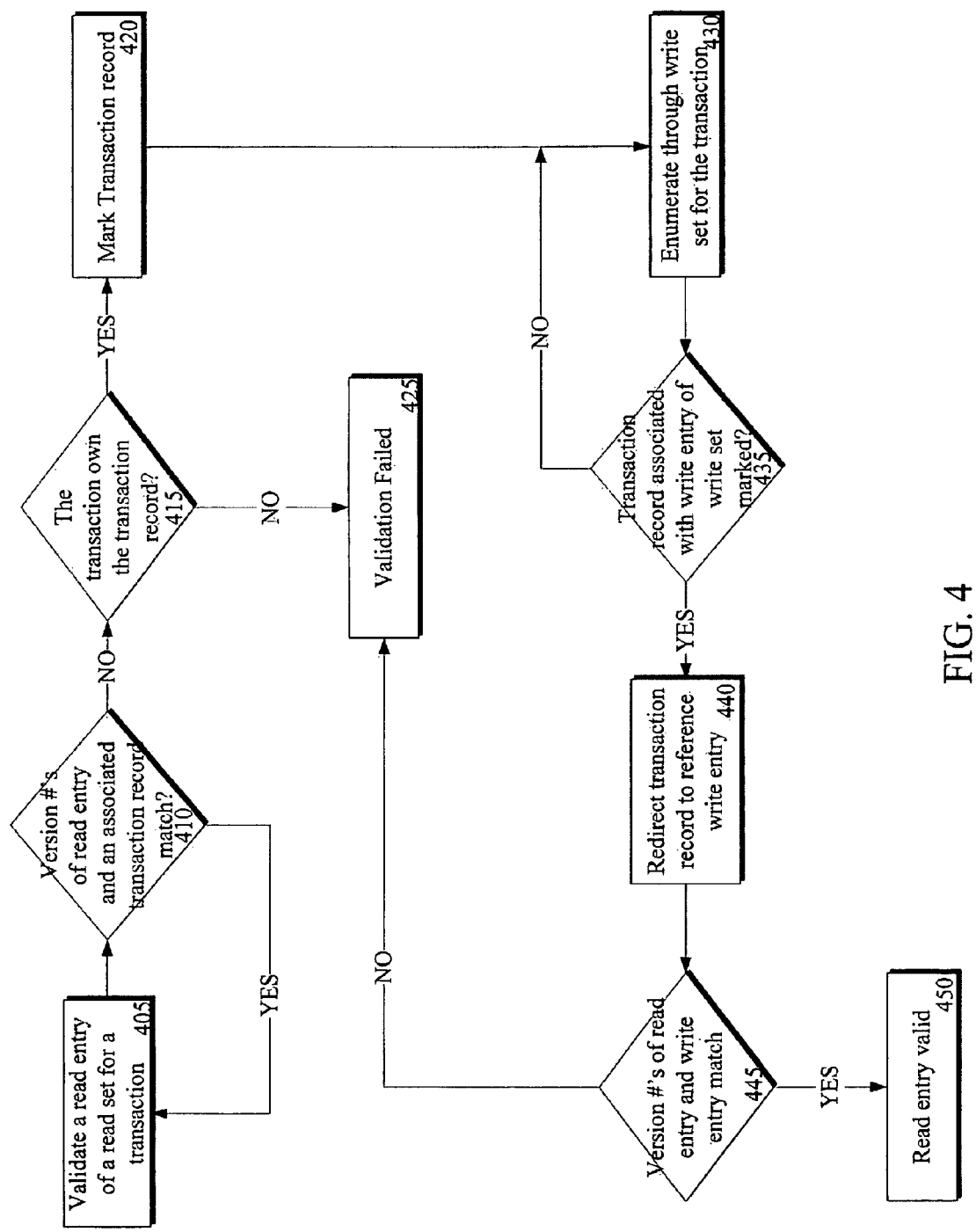
FIG. 4 illustrates an embodiment of a flow chart for another method of hybrid transactional validation.

Referring next to FIG. 3, an embodiment of a flowchart for a method of a hybrid validation STM is illustrated. Note the flowcharts of FIGS. 3-4 are illustrated in a substantially serial fashion. However, the methods illustrated by these Figures are not so limited, as they may occur in any order, as well as being performed partially or fully in parallel.

In one embodiment, during execution of a transaction, ownership of a data element is acquired by updating a meta-data location associated with the data-element to a reference to the transaction. For example, before a write operation in the transaction, a write barrier checks ownership of the meta-data location, and if un-owned, the meta-data location is updated to a pointer to a transaction descriptor associated with the transaction. As a result, subsequent ownership checks to the meta-data/transaction record are capable of being efficiently performed, as a direct reference to the transaction descriptor is present.

At validation, in block 305 it is determined if a data element read within a transaction is also written to within the transaction. Any known method of determining if a data element is both read and written within a transaction may be utilized. As one example, a read set for the transaction is validated utilizing version numbers. However, when a transaction record, which is associated with a read entry of the read set, holds the transaction descriptor value, as described above, then it is determined that the transaction read from and wrote to a data element. For example, when a read entry exists that references the transaction record, it indicates that a data element associated with the transaction record was read. Furthermore, if the transaction record currently includes a pointer to the transaction descriptor, then it is determined the transaction acquired the transaction descriptor/lock for a write operation.

If the data element is not determined to be read by and written to during a pendency of the transaction, then validation proceeds as normal in block 310. For example, if a transaction record associated with a read entry holds a different version or an ownership value for another transaction, then the transaction fails and is potentially aborted.

In contrast, if a data element is determined to be read from and written to within the transaction, then in block 315, the transaction record/meta-data location associated with data element is updated from the reference to the owning transaction to a reference to a write entry of a write set for the transaction. For example, a pointer to a transaction descriptor is redirected to point to an associated write entry. As a result, validation for the read entry is potentially efficiently performed through version validation of the read entry and the write entry. As can be seen from this example, a small amount of extra bookkeeping is done when a specific validation condition, such as a write after read condition within a transaction, is determined to enable more efficient validation.

Turning to FIG. 4, another embodiment of a flowchart for a method of a hybrid validation STM is illustrated. Note that an oversimplified example to illustrate an embodiment of the method of FIG. 4 is utilized with reference to FIG. 2 below. However, the flowchart for the method depicted in FIG. 4 is not so limited.

In one embodiment, during execution within transaction 281, a direct STM is utilized. For example, when a load operation to read data 201 is encountered, an ownership test is performed. Here, transaction record 250 associated with data 201 is checked. In one embodiment, version bit 251 of transaction record 250 is checked. Here, transaction record 250 includes a version, as indicated by version bit 251 being set. As a result, the version is logged in read entry 266 of read set 265 for the transaction along with a reference to transaction record 250, such as pointer 277 to transaction record 250.

Subsequently, a store operation to write to data 201 is encountered within transaction 281. Once again, the ownership test is performed. Assuming no other write to data 201 has occurred, version bit 251 still indicates transaction record 250 is un-owned. The version held in transaction record 250 is logged in write entry 271 of write set 270 along with reference 272 to transaction record 250. In addition, transaction record 250 is updated to a reference to transaction descriptor 280 associated with transaction 281, such as pointer 291 to transaction descriptor 280. Note, in one embodiment, a reference to transaction descriptor 281 may also be held in write entry 271.

Subsequently, if another read or write to data 201 within transaction 281 is encountered, then the ownership test is once again performed. However, this time, version bit 251 indicates that transaction record 250 for data 201 is owned. As transaction record 250 was not released yet, transaction record 250 still points to transaction descriptor 280 associated with transaction 281. As a result, transaction 281 is able to directly identify that it owns transaction record 250 from pointer 291 to transaction 281's descriptor 280. After determining transaction 281 already owns transaction record 250, the transactional read or write may then be performed.

When transaction 281 reaches a potential commit point, transaction 281 is validated to ensure data validity and correct execution. In one embodiment, validation of a transaction includes validating a read set for transaction to ensure no invalidating accesses have occurred during execution of a transaction. However, validation is not limited to a commit point of the transaction. For example, on demand validation may be performed at read and write barriers within the transaction. As a result, similar indirect validation methods, as described herein, may be utilized at other validation points.

In block 405 a read entry of a read set for a transaction is validated. In one embodiment, validation of a read entry includes comparing a logged version number from a read entry and a current value held in a transaction record associated with read entry in block 410. If the value matches the logged version number, then the validation for read entries continues normally in a return to block 405, i.e. the next read entry is validated. As discussed below, if all of the read entries of the read set are determined to be valid, then a transaction may be committed.

However, the versions, when compared, may not match. Continuing the example, transaction record 250 was updated to hold pointer 291 to transaction descriptor 280 associated with transaction 281. As a result, the logged version number held in read entry 266 does not match the value of pointer 291 to transaction descriptor 280, i.e. the current value held in transaction descriptor. Therefore, continuing the flowchart, in block 415 it is determined if transaction 281 owns transaction record 250. In other words, it is determined if transaction 281 read data 201 and then wrote to data 201. If transaction 281 does not own transaction record 250 after determining the versions do not match, then transaction 281 fails in block 425, as another access has at least acquired transaction record 250 and potentially updated data 201. In contrast, when transaction record 250 holds pointer 291 to transaction descriptor 280 associated with transaction 281, then it is determined that transaction 281 does own transaction record 250.

In one embodiment, after determining that a transaction has read from and subsequently written to data within a transaction, then it is left to determine that an invalidating access did not occur between the time the read was performed and the time the transaction record was acquired for the write. One embodiment of making this determination is illustrated in blocks 420-445.

After determining transaction 281 read from and wrote to data 201, then in block 420, transaction record 250 is marked. Any method of marking a location or reference thereto may be utilized. In one embodiment, transaction record 250 includes a validate field, such as validate field 252, which is similar in operation to version field 251. As an example, when validate field 252 holds a first value transaction record 250 is not marked. Therefore, here, marking of transaction record 250 includes updating validate field 252 to a second value to indicate transaction record 250 is marked.

In one embodiment, the flowchart returns to block 405 to perform marking for all transaction records of read entries in the read set that conform to the above conditions for reaching block 420. In other words, in one example, marking for all transaction records that have been read from and then written to within the transaction is performed.

Enumeration through write set 271 for transaction 281 is then performed in block 430. Each of the transaction records associated with/referenced by write entries of the write set are checked to see if they are marked in block 435. If a write entry is not marked, then the next write entry is checked. From the example above, remember that write entry 271 was updated with a logged version and reference 272 to transaction record 250. Also note that transaction record 250 was marked in block 420. Therefore, write entry 271 is said to be associated with marked transaction record 250 through back pointer 272 held in write entry 271 to transaction record 250.

As a result, when write entry 271 is encountered during enumeration through write set 271 for transaction 281, referenced transaction record 250 is determined to be marked in block 435. As an illustrative example, validate bit 252 of transaction record 250 is set to indicate transaction record 250 is marked. Consequently, in block 440, transaction record 250 is redirected from pointer 291 to transaction descriptor 280 to pointer 292 to write entry 271. In one embodiment, even when transaction record 250 is redirected to write entry 271, validate field 252 remains holding a marked value to indicate transaction record 250 is still marked and the version bit 251 remains holding a value to correctly indicate transaction record 250 to be owned. As an illustrative example, after redirecting in block 440, the flowchart returns to blocks 430 and 435. In other words, all the marked transaction records referenced by write entries in the write set are redirected to those write entries.

Next, read set 265 is again enumerated to identify read entries associated with marked transaction records, such as read entry 266 associated with marked transaction record 250, which is determined from validate field 252 holding a marked value. In block 445 it is determined if the logged version numbers of read entry 266 and write entry 277 match. Note that transaction record 250 now includes pointer 292 to corresponding write entry 271, so the logged version from read entry 266, which is currently under inspection, and write entry 271, which is directly referenced, may be directly compared. If the versions do not match, then in block 425, the transaction fails. In other words, if the versions do not match, then some other access to the transaction record occurred between the read and the write within the transaction. However, as in this example, if the versions do match, then the read entry is valid, and further validation may continue or the transaction may be committed appropriately.

Therefore, as can be seen from above, a hybrid STM may be utilized to efficiently perform ownership tests during execution of the transaction and to efficiently perform validation for the transaction. During execution, acquired transaction records are updated to point to associated transaction records. As a result, upon subsequent ownership tests, the transaction ownership information is directly held in transaction records, allowing for efficient subsequent transaction memory accesses. However, upon validation, transaction records associated with data read from and written to within the transaction are redirected to associated write entries, which enables efficient validation of logged version values from read and write entries.

A module as used herein refers to any hardware, software, firmware, or a combination thereof. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices. However, in another embodiment, logic also includes software or code integrated with hardware, such as firmware or micro-code.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible or machine readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash memory devices; electrical storage device, optical storage devices, acoustical storage devices or other form of propagated signal (e.g., carrier waves, infrared signals, digital signals) storage device; etc. For example, a machine may access a storage device through receiving a propagated signal, such as a carrier wave, from a medium capable of holding the information to be transmitted on the propagated signal.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A non-transitory, machine readable medium including program code stored thereon which, when executed, causes a machine to perform the operations of:
   determining a data element has been read by and written to by a transaction;
   updating a meta-data location associated with the data element from a direct reference to a transaction descriptor associated with the transaction to a direct reference to a write entry associated with the data element in response to determining the data element has been read by and written to by the transaction, wherein updating the meta-data location comprises replacing the direct reference to the transaction descriptor with the direct reference to the write entry; and
   updating the meta-data location to a version value upon committing the transaction after updating the meta-data location associated with the data element from the reference to the transaction descriptor to the reference to the write entry in response to determining the data element is read by and written to by the transaction.

2. The machine readable medium of claim 1, wherein the meta-data location includes a transaction record, the transaction reference includes a pointer to a transaction descriptor associated with the transaction, and the reference to the write entry includes a pointer to the write entry.

3. The machine readable medium of claim 2, wherein determining a data element is read by and written to during execution of a transaction comprises:
   determining a read entry of a read set, which is associated with the transaction, references the transaction record; and
   determining the transaction record holds the pointer to the transaction descriptor before updating the transaction record from holding the pointer to the transaction descriptor to holding the pointer to the write entry.

4. The machine readable medium of claim 3, wherein updating the transaction record from holding the pointer to the transaction descriptor to holding the pointer to the write entry in response to determining the data element is read by and written to during execution of the transaction comprises:
   marking the transaction record in response to determining the read entry references the transaction record and determining the transaction record holds the pointer to the transaction descriptor; and
   updating the transaction record to hold the pointer to the write entry in response to marking the transaction record.

5. The machine readable medium of claim 4, wherein marking the transaction record comprises: setting a validation bit of the transaction record to a validation value.

6. The machine readable medium of claim 4, wherein the program code which, when executed by a machine, causes the machine to further perform the operations of:

determining if the data element has been invalidly accessed after being read by and before being written to during execution of the transaction;

aborting the transaction in response to determining the data element has been invalidly accessed after being read by and before being written to during execution of the transaction; and committing the transaction in response to determining the data element has not been invalidly accessed after being read by and before being written to during execution of the transaction and determining no other invalid accesses occurred during execution of the transaction.

7. The machine readable medium of claim 6, wherein determining if the data element has been invalidly accessed after being read by and before being written to during execution of the transaction comprises:

determining if a read log version number held in the read entry matches a write log version number held in the write entry;

determining the data element has been invalidly accessed after being read by and before being written to during execution of the transaction in response to the read log version number not matching the write log version number; and determining the data element has not been invalidly accessed after being read by and before being written to during execution of the transaction in response to the read log version number matching the write log version number.

8. A non-transitory, machine readable medium including program code stored thereon which, when executed, causes a machine to perform the operations of:

determining a meta-data location, which is associated with a read entry of a read set for a transaction, holds an ownership reference to the transaction during validation of the read set, wherein the meta-data location is associated with a data element, and wherein the ownership reference to the transaction indicates that the data element has been read by and written to by the transaction;

marking the meta-data location, which is associated with the read entry, in response to determining the meta-data location holds the ownership reference to the transaction; and determining a write entry of a write set includes a reference to the meta-data location; and updating the meta-data location to a write reference to the write entry in response to the meta-data location being marked, wherein updating the meta-data location comprises replacing the ownership reference with the write reference.

9. The machine readable medium of claim 8, wherein the program code which, when executed by a machine, causes the machine to further perform the operations of: validating a read version number held in the read entry in relation to a write version number held in the write entry.

10. The machine readable medium of claim 8, wherein determining the meta-data location, which is associated with the read entry, holds the ownership reference to the transaction during validation of the read set comprises:

determining a logged read version number held in the read entry is not equal to a meta-data location value held in the meta-data location; and determining the meta-data location value includes the ownership reference to the transaction, which is to indicate the transaction owns the meta-data location.

11. The machine readable medium of claim 10, wherein determining a logged read version number held in the read entry is not equal to a meta-data location value held in the meta-data location comprises: determining a version bit of the meta-data location value includes a locked value to indicate the meta-data location is owned.

12. The machine readable medium of claim 10, wherein the program code which, when executed by a machine, causes the machine to further perform the operations of:

aborting the transaction in response to determining the logged read version number is not equal to the meta-data location and determining the meta-data location value does not include the ownership reference.

13. The machine readable medium of claim 8, wherein marking the meta-data location comprises: setting a validation bit of the meta-data location to a validate value.

14. A method comprising:

updating a meta-data location associated with a data element to hold a transaction descriptor value associated with a transaction before executing a store operation within the transaction to write to the data element; and updating the meta-data location to hold a write entry value associated with a write entry of a write set for the transaction during validation of the transaction in response to determining a load operation to read the data element within the transaction was executed before executing the store operation, wherein updating the meta-data location to hold the write entry value comprises replacing the transaction descriptor value with the write entry value.

15. The method of claim 14, wherein updating the meta-data location to hold the transaction descriptor value before executing the store operation within the transaction to write to the data element comprises:

determining if the meta-data location is un-owned; and updating the meta-data location to hold the transaction descriptor value before executing the store operation in response to determining the meta-data location is un-owned.

16. The method of claim 15, wherein determining if the meta-data location is unowned comprises:

determining the meta-data location is un-owned in response to an ownership bit of the meta-data location holding a first logical value; and determining the meta-data location is owned in response to the ownership bit of the meta-data location holding a second logical value.

17. The method of claim 16, wherein the meta-data location includes a transaction record, and wherein the transaction descriptor value associated with a transaction includes a pointer to a transaction descriptor for the transaction.

18. The method of claim 14, further comprising:

encountering a read entry of a read set for the transaction during validation of the transaction, the read entry to reference the meta-data location and to be associated with the load operation to read the data element;

determining the load operation was executed before executing the store operation in response to the meta-data location holding the transaction descriptor value associated with the transaction after encountering the read entry during validation of the transaction.

19. The method of claim 18, wherein the read entry is to hold a read log version value and a reference to the meta-data location, and wherein the write entry is to hold a write log version value and a reference to the meta-data location.

20. The method of claim 14, further comprising marking the meta-data location in response to determining the load operation to read the data element within the transaction was executed before executing the store operation, wherein updating the meta-data location to hold a write entry value associated with a write entry of a write set for the transaction during validation of the transaction in response to determining a load operation to read the data element within the transaction was executed before executing the store operation comprises: updating the meta-data location to hold the write entry value associated with the write entry of the write set for the transaction during enumerating through the write set in response to the meta-data location being marked.

* * * * *